United States Patent [19]

Demura et al.

[11] Patent Number: 4,799,769
[45] Date of Patent: Jan. 24, 1989

[54] LIQUID CRYSTAL ANTIDAZZLE MIRROR

[75] Inventors: Hiroshi Demura, Toyota, Japan; Akira Kawahashi, Stanford, Calif.; Kazumi Hayashi, Okazaki; Sadao Kokubu, Aichi, both of Japan

[73] Assignee: Toyota Jidosha Kabushiki Kaisha, Aichi, Japan

[21] Appl. No.: 883,881

[22] Filed: Jul. 9, 1986

[30] Foreign Application Priority Data

Jul. 9, 1985 [JP] Japan .................... 60-104583

[51] Int. Cl.$^4$ .................................. G02F 1/13
[52] U.S. Cl. .......................... 350/331 R; 350/332; 350/276 R; 350/278
[58] Field of Search .............. 350/331 R, 338, 342, 350/278, 279, 283, 332, 276 R; 307/597, 200 B; 361/92, 111

[56] References Cited

U.S. PATENT DOCUMENTS 4,168,442  9/1979  Satou et al. ............... 307/200 B
4,530,027  7/1985  Berger ...................... 361/92
4,669,827  6/1987  Fukada et al. .............. 350/283
4,671,615  6/1987  Fukada et al. .............. 350/283

Primary Examiner—Stanley D. Miller
Assistant Examiner—Trong Q. Phan
Attorney, Agent, or Firm—Kenyon & Kenyon

[57] ABSTRACT

A liquid crystal antidazzle mirror for turning OFF a power of a liquid crystal drive control circuit by a power switch provided between the liquid crystal drive control circuit and a power source comprising a capacitor of a predetermined capacity disposed between the power switch and the liquid crystal drive control circuit and connected in parallel between power lines to supply power from the capacitor to at least a mode memory circuit in the liquid crystal drive control circuit for a predetermined time determined by the discharging characteristic of the capacitor when the power switch is opened. Thus, the mirror can reset the set mode of the antidazzle mirror to the used mode immediately before a power switch is opened when the power switch is closed within a predetermined time after the power switch is opened.

3 Claims, 2 Drawing Sheets

LIQUID CRYSTAL ANTIDAZZLE MIRROR

BACKGROUND OF THE INVENTION

This invention relates to a liquid crystal antidazzle mirror used for a vehicle.

A liquid crystal antidazzle mirror which utilizes a liquid crystal is used as one type of an antidazzle mirror in an automobile. This liquid crystal antidazzle mirror alters the light transmission factor of the liquid crystal by controlling a voltage applied to the liquid crystal disposed in front of a mirror to control the reflectivity of the mirror, thereby performing the antidazzle action.

This liquid crystal antidazzle mirror described above necessitates a power source for driving the liquid crystal in principle of the operation. An automotive battery is generally used as this power source for the antidazzle mirror, but it is desirable to supply electric power from the battery only in case of using the antidazzle mirror so as to protect the battery against its discharge since the capacity of the battery is limited. The inventor of this invention has proposed a prior liquid crystal antidazzle mirror which has solved the problem of a decrease in the capacity of the automotive battery as disclosed in Japanese Utility Model Application No. 169708/1984. This liquid crystal antidazzle mirror is constructed, as shown in FIG. 2, of a liquid crystal drive control circuit 32 for controlling a voltage applied to a liquid crystal 31, and a power switch 34 cooperated with a key cylinder is connected between the control circuit 32 and a battery 33, and a key plate is plugged in a key cylinder as a so-called power is supplied only in the vehicle available state.

The abovementioned prior liquid crystal antidazzle mirror is effective in energy-saving since supplying power from the battery only when the power is supplied only in the vehicle available state. However, since the power supply is interrupted simultaneously when the power switch 34 is opened, the control circuit 32 is reset to the special predetermined initial set mode of antidazzle mode on dazzle mode. Thus, in the conventional antidazzle mirror, even if the power switch is closed to use again the vehicle immediately after the power switch is opened or within little time from when the switch is opened, it is difficult to effectively reset the mode of the antidazzle mirror to the used mode immediately before the power switch is opened. In general, when the vehicle is used immediately after the power switch is opened or within short time after the power switch is opened, it is normal that the circumstances around the vehicle do not almost change. Thus, it is desired to reset the mode of the antidazzle mirror to the used mode immediately before the power switch is opened simultaneously when the power switch is closed. As described above, since it is impossible in the conventional liquid crystal antidazzle mirror to the used mode immediately before the power switch is opened when the power switch is again used, the desired mode must be obtained by operating the mode change switch whenever the power switch is closed.

SUMMARY OF THE INVENTION

It is, accordingly, an object of this invention to provide a liquid crystal antidazzle mirror which can eliminate the aforementioned drawbacks and can reset the set mode of the antidazzle mirror to the used mode immediately before a power switch is opened when the power switch is closed within a predetermined time after the power switch is opened.

In order to achieve the above and other objects, there is provided a liquid crystal antidazzle mirror for turning OFF a power of a liquid crystal drive control circuit by a power switch provided between the liquid crystal drive control circuit and a power source comprising a capacitor of a predetermined capacity disposed between the power switch and the liquid crystal drive control circuit and connected in parallel between power lines to supply power from the capacitor to at least a mode memory circuit in the liquid crystal drive control circuit for a predetermined time determined by the discharging characteristic of the capacitor when the power switch is opened.

When the power switch is closed, the power source is connected to the liquid crystal drive control circuit to become available state. Accordingly, the antidazzle mirror can be freely set to any of antidazzle and dazzle modes by operating the mode change switch of the liquid crystal drive control circuit.

If a driver removes a key plate to open the power switch due to separation from the vehicle for a slight period owing to certain reason, the power of the liquid crystal drive control circuit is simultaneously interrupted. However, since the capacitor connected in parallel with the power source between the liquid crystal drive control circuit and the power switch is charged to the power source voltage, when the power switch is opened, the capacitor simultaneously starts discharging, and supplies power to the liquid crystal drive control circuit for a predetermined time determined by the discharging characteristic. Therefore, the mode memory circuit in the liquid crystal drive control circuit continues holding the used mode state of the antidazzle mirror for a predetermined time determined by the discharging characteristic of the capacitor immediately before the power switch is opened by the power supply from the capacitor. As a result, if the driver returns to the vehicle within the predetermined time determined by the discharging characteristic of the capacitor and closes the power switch, the antidazzle mirror is reset to the used mode state immediately before the power switch is opened without any operation.

As described above, since the circumstances around the vehicle do not almost vary in case that the vehicle is again used immediately after the power switch is opened or in a short time from when the power switch is opened, it is very convenient in use of the antidazzle mirror to automatically reset the antidazzle mirror to the used mode immediately before the power switch is opened when the power switch is again closed.

Incidentally, since the discharging characteristic of the capacitor can be freely set by the capacity of the capacitor and the impedance of the circuit connected to the capacitor, the mode memory holding time of the mode memory, i.e., the waiting time for again closing the power switch can be freely set.

BRIEF DESCRIPTION OF THE DRAWINGS

The above and other related objects and features of the invention will be apparent from a reading of the following description of the disclosure found in the accompanying drawings and novelty thereof pointed out in the appended claims.

DESCRIPTION OF THE PREFERRED EMBODIMENTS

This invention will now be described in detail with reference to FIG. 1, which shows an embodiment of the liquid crystal antidazzle mirror according to this invention.

Figure 1:
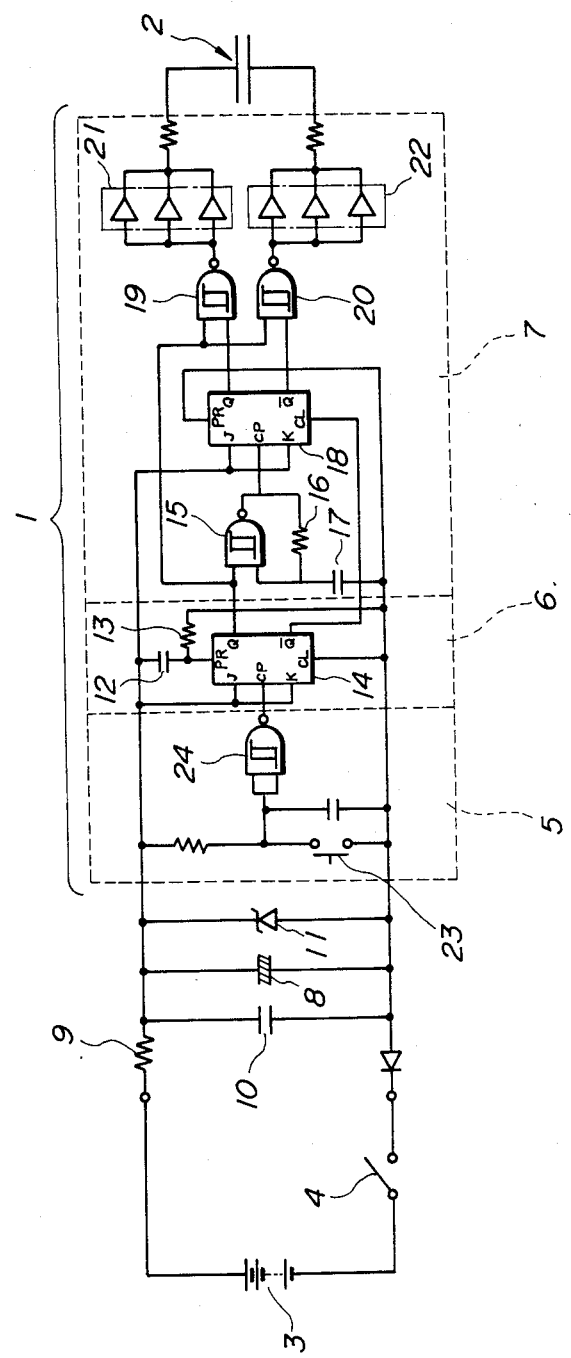
FIG. 1 is an electric circuit diagram showing an embodiment of the invention.
Figure 2:
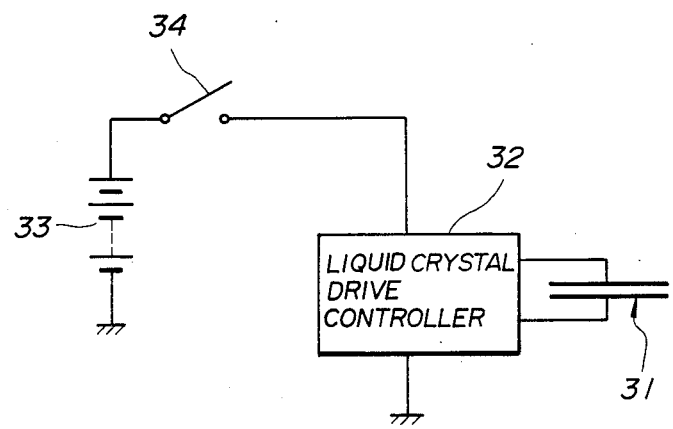
FIG. 2 is a block circuit diagram showing the construction of the conventional antidazzle mirror.

FIG. 1 is a block circuit diagram showing an embodiment of a liquid crystal antidazzle mirror according to the present invention. Numeral 1 designates a liquid crystal drive control circuit for controlling a voltage applied to a liquid crystal 2, numeral 3 a battery, and numeral 4 a power switch inserted between the battery 3 and the control circuit 1. The control circuit 1 is constructed to supply power from the battery 3 when the switch 4 is closed. The switch 4 is, for example, associated integrally with a key cylinder to close its contact when the key plate is inserted into the key cylinder to use a vehicle.

The liquid crystal drive control circuit 1 has a mode switching circuit 5 for arbitrarily switching the used mode of the antidazzle mirror, i.e., between antidazzle and dazzle modes, a mode memory circuit 6 for storing the used mode of antidazzle on dazzle modes set by the switching circuit 5, and a drive circuit 7 for controlling a voltage applied to the liquid crystal 2 according to the stored mode of the memory circuit 6.

The present invention is a liquid crystal antidazzle mirror constructed as described above which has a capacitor 8 of large capacity connected in parallel between power source lines between the power switch 4 and the control circuit 1. In FIG. 1, numeral 9 designates a current limiting resistor, numeral 10 a noise absorbing capacitor, and numeral 11 designates a Zener diode for protecting against an overvoltage.

In the circuit in FIG. 1, when the switch 4 is closed by inserting the key plate into the key cylinder, power is supplied from the battery 3. The capacitor 8 is charged by the power from the battery, the charging current flows through a preset capacitor 12 to a preset resistor 13. Thus, a signal "1" is applied to the preset terminal PR of the flip-flop 14, thereby setting the flip-flop 14 at its terminal Q to "1" and at its terminal $\overline{Q}$ to "0".

When the flip-flop 14 is set at its terminal Q to "1" and at its terminal $\overline{Q}$ to "0" as described above, the signal "1" from the terminal Q is input to one gate of a Schmitt circuit 15 for forming an oscillator, which starts oscillating in the frequency determined by a resistor 16 and a capacitor 17 and generates a rectangular wave output. Simultaneously the signal "0" from the terminal $\overline{Q}$ is input to the clear terminal CL of the flip-flop 18 for dividing the frequency and shaping the waveform, to set the flip-flop 18 to a countable state. Therefore, the flip-flop 18 divides by 2 the rectangular wave oscillation output inputted from the Schmitt circuit 15 and outputs rectangular waves of reverse phase from the output terminals Q and $\overline{Q}$, respectively. The rectangular wave outputs are respectively input to one gate of waveform inverting Schmitt circuits 19, 20, respectively, and the signal "1" from the output terminal Q of the flip-flop 14 is applied to the other gate of the Schmitt circuits 19, 20 respectively. Thus, the Schmitt circuits 19, 20 invert the rectangular waves input from the flip-flop 18, and respectively drive ON or OFF in reverse phase drivers 21 and 22 to apply a reverse phase voltage between both electrodes of the liquid crystal 2, thereby initializing the liquid crystal 2 to dazzle state applied with the voltage. Thus, the voltage is applied to the liquid crystal 2. Accordingly, the liquid crystal 2 is initialized to the dazzle state having high light transmission factor. In this manner, the liquid crystal antidazzle mirror exemplified in the drawings is initialized to the dazzle state simultaneously when the power is supplied from the battery to the antidazzle mirror. In case that the antidazzle mirror is switched from the dazzle state to antidazzle mirror is switched from the dazzle state to the antidazzle state after initialized, the capacitor 12 and the resistor 13 may be connected to the clear terminal CL of the flip-flop 14.

As described above, if the antidazzle state is switched, for example, at night after the dazzle state is initialized simultaneously upon the supply of power, when the switch 23 is pressed, an earth potential is applied to the Schmitt circuit 24. Thus, the Schmitt circuit 24 generates a signal "1" to the clock pulse terminal CP of the flip-flop 14 to invert the set state of the flip-flop 14 at its terminal Q to "0" and at its terminal $\overline{Q}$ to "1". Therefore, when the flip-flop 14 is set at its terminal Q to "0", the Schmitt circuit 15 stop oscillating. Further, since the Schmitt circuit 19, 20 are also fixed to high potential state of the output "1", the drivers 21, 22 are all turned ON, a voltage is not thus applied to between the terminals of the liquid crystal 2, and the liquid crystal 2 is switched to the antidazzle state having small light transmission factor. Thus, the antidazzle state is set at night to protect the driver from the dazzling light by headlights of the trailing vehicle.

If the driver removes the key plate from the key cylinder due to certain reason by stopping the vehicle while using the vehicle in antidazzle state as described above, the power switch 4 is simultaneously opened to interrupt the supply of power from the battery 3. In case of the conventional liquid crystal antidazzle mirror, the operation of the control circuit 1 is all reset simultaneously upon interruption of the power source, and the circuit is reset to the initialized state. Accordingly, even if the power switch 4 is again closed immediately after the power switch is opened, the control circuit 1 cannot be reset to the old antidazzle state, and the dazzle state of the initialized state is set by repeating the initializing operation in the same manner as described above.

On the contrary, according to the present invention, as described above, when the switch 4 is opened to interrupt the power of the battery 3, the capacitor 8 connected in parallel between the power lines between the power switch 4 and the control circuit 1 starts discharging the charged power simultaneously when the power switch is opened, and operates as the power to the control circuit 1. Accordingly, the operating state of the control circuit 1 remains as it is and the memory of the mode memory circuit 6 for storing the used mode of the antidazzle mode immediately before the power switch is opened. This holding operation is maintained for the predetermined time even if the discharging voltage of the capacitor 8 becomes a predetermined value of lower. Therefore, if the power switch 4 is again closed immediately after the switch 4 is opened or within a predetermined time after the switch 4 is opened, at least the memory circuit 6 continues to hold the used mode immediately before the switch 4 is opened. Thus, the control circuit 1 again automatically resets to the used mode immediately before the switch 4 is opened.

Therefore, even if the driver separates from the vehicle for a while and again rises in the vehicle, the antidazzle mirror can be automatically reset to the used mode before, and it is not necessary to operate again the mode change switch.

According to the present invention as described above, when the power switch is again closed within a predetermined time after the power switch is opened, the set mode of the antidazzle mirror can be automatically reset to the used state immediately after the power switch is opened, and it is not necessary to again set the mode change operation when the power source is again energized, thereby improving the operability of the switch in the liquid crystal antidazzle mirror.

We claim:

1. An antidazzle mirror including a liquid crystal layer disposed in front of the mirror and a drive control circuit for controlling the operating mode of the liquid crystal, the drive control circuit comprising:

a drive circuit for controlling a voltage applied to the liquid crystal to change the light transmission factor of the layer between a high transmission dazzle mode and a low transmission antidazzle mode;

a mode memory circuit connected to the drive circuit for delivering a command signal for selectively placing the mirror in one of the dazzle and antidazzle modes; and a mode switching circuit connected to the mode memory circuit, the mode switching circuit having a manually operable switch for changing the mode memory circuit from the one mode to the other mode, wherein a capacitor is connected across power supply lines in parallel with a power source between a power switch and the mode memory circuit so as to be charged when the power switch is closed, the capacitor having a predetermined capacity sufficient to continue to supply power to the mode memory circuit for a predetermined time after the power switch is opened, so as to maintain for said predetermined time the mode memory circuit in the mode in effect at the time of opening the power switch.

2. A drive control circuit according to claim 1 wherein the mode memory circuit comprises a flip-flop.

3. A drive control circuit according to claim 2 wherein said mode switching circuit comprises means having an output terminal for delivering a pulse each time the manually operable switch is actuated, the output terminal of said pulse delivering means being connected to the flip-flop of the mode memory circuit.

* * * * *

UNITED STATES PATENT AND TRADEMARK OFFICE
CERTIFICATE OF CORRECTION

PATENT NO. : 4,799,769

DATED : January 24, 1989

INVENTOR(S) : Hiroshi DEMURA et al.

It is certified that error appears in the above-identified patent and that said Letters Patent is hereby corrected as shown below:

Title Page, item [73]: Add the second assignee's name as follows:
--KABUSHIKI KAISHA TOKAI RIKA DENKI SEISAKUSHO--.

Signed and Sealed this

Twenty-ninth Day of May, 1990

*Attest:*

HARRY F. MANBECK, JR.

*Attesting Officer*  *Commissioner of Patents and Trademarks*